May 28, 1929.  M. SANCHEZ  1,714,524
INSECT DESTROYER
Filed April 21, 1928  2 Sheets-Sheet 1
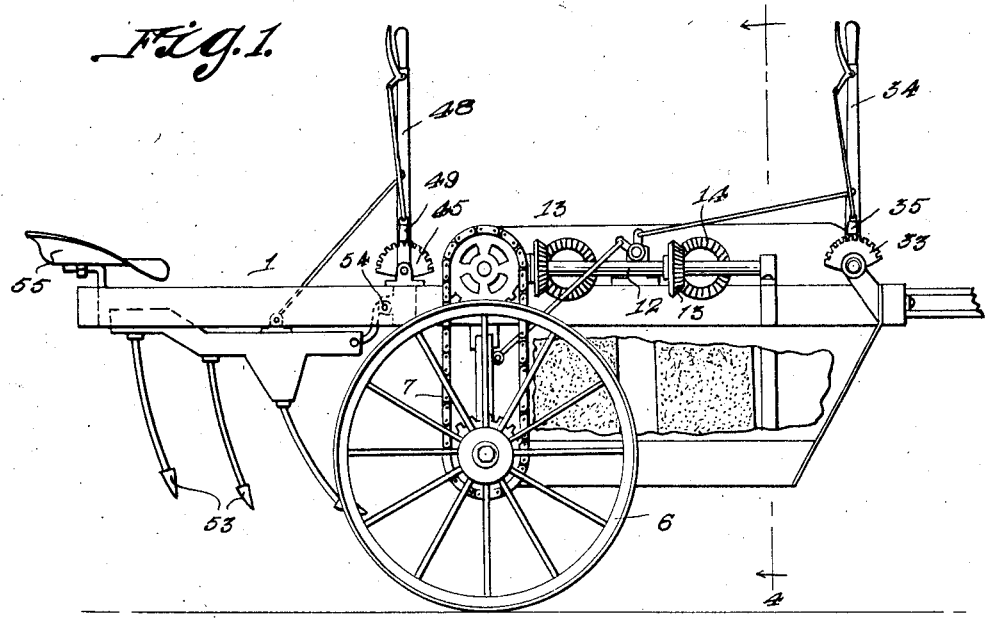
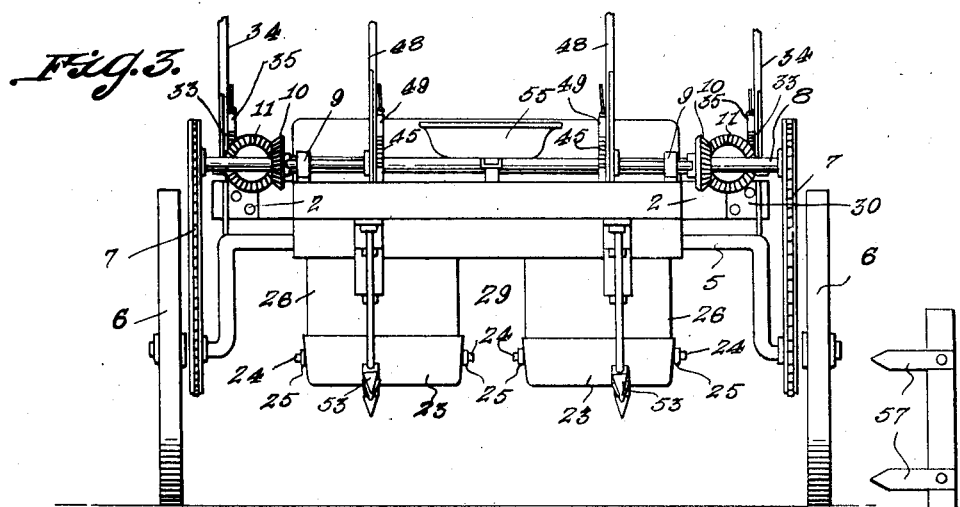
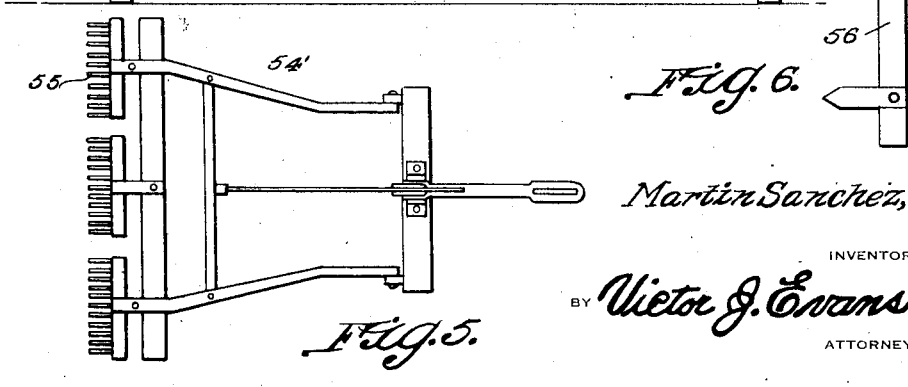
Martin Sanchez,
INVENTOR
BY Victor J. Evans
ATTORNEY May 28, 1929. M. SANCHEZ 1,714,524
INSECT DESTROYER
Filed April 21, 1928   2 Sheets-Sheet 2
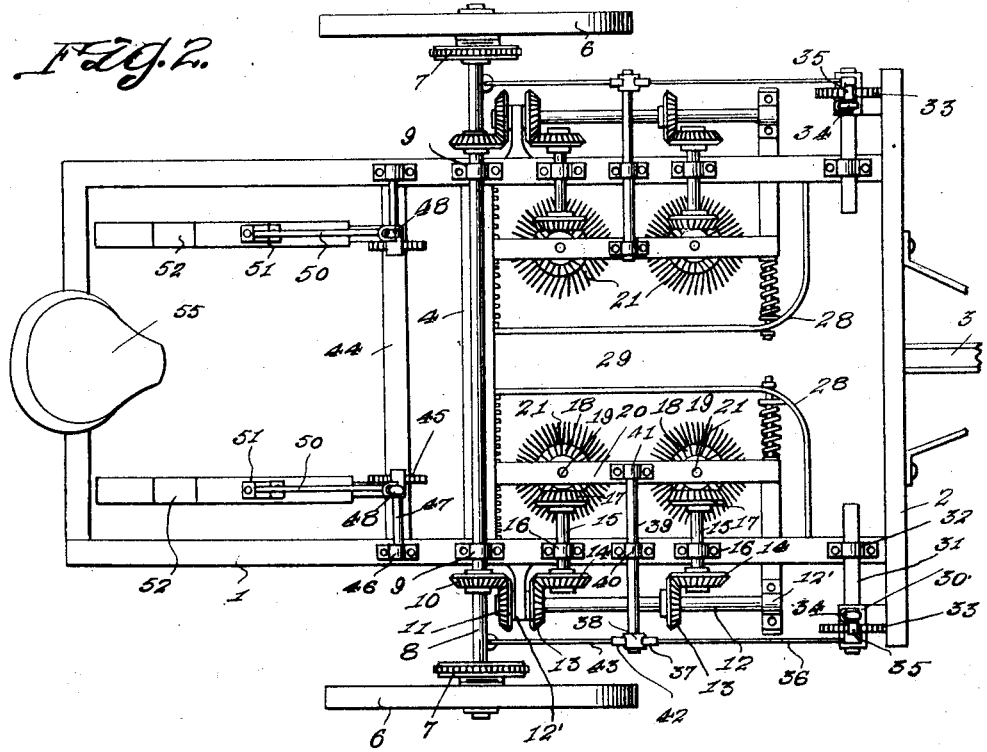

Patented May 28, 1929.

1,714,524

UNITED STATES PATENT OFFICE.

MARTIN SANCHEZ, OF NUEVO LAREDO, MEXICO.

INSECT DESTROYER.

Application filed April 21, 1928. Serial No. 271,790.

My present invention has reference to a cotton cultivating machine and my primary object is the provision of a machine for this purpose which will cultivate the earth prior to the germination of the cotton seeds, cultivate the earth around the cotton in the varying growths thereof and which shall be provided with vertically disposed cylindrical brushes of suitable fibrous material that will act on the cotton to remove insects therefrom and to effectively trap such insects when gathered from the cotton growth so that the same can be conveyed away from the field and destroyed.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claim.

In the drawings:

Figure 1 is a side elevation of my improvement with parts broken away.

Figure 2 is a top plan view thereof.

Figure 3 is a rear elevation thereof.

Figure 4 is a sectional view approximately on the line 4—4 of Figure 1.

Figure 5 is a plan view of one of the toothed implements which may be employed.

Figure 6 is a plan view of a second type of toothed implement which may be employed.

As disclosed by the drawings I make use of a substantially rectangular frame 1 which provides the body of the improvement and which is preferably but not necessarily constructed of wood. The front transverse beam 2 of the frame 1 projects a suitable distance beyond the sides thereof and to this front there is attached the tongue 3 for the draft animals.

The frame at approximately the center thereof has a transverse member or beam 4 connecting the sides, and this member may depend below the frame and be formed with a longitudinal opening therethrough that affords a bearing for the straight portion 5 of a crank axle. The parallel depending sides of the axle merge into spindles on which are journaled the ground wheels 6, and the said ground wheels have fixed upon the inner faces of their hubs sprocket wheels around which are trained sprocket chains 7. These sprocket chains are upwardly directed and are trained around sprocket wheels on the ends of a shaft 8 that is arranged transversely over the top of the frame and journaled through suitable bearings 9 supported on the said frame. The shaft 8 also has fixed thereon bevel gears 10, and these gears are in mesh with similar gears 11 that are fixed on one of the ends of the shafts 12, the said shafts being journaled through suitable spaced bearings 12' that extend laterally from the sides of the frame or body 1. On the shafts 12 there are fixed other bevel gears arranged in spaced pairs and indicated by the numeral 13, respectively, and these gears in turn mesh with bevel gears 14 fixed on the ends of short shafts 15, respectively, which are journaled in suitable bearings 16 on the sides of the frame, 1. The inner or second end of each of the shafts 15 has fixed thereon a second bevel gear 17.

The bevel gears 17 are loosely in mesh with bevel gears 18 on the upper ends of vertically disposed shafts 19. These shafts have their upper ends loosely journaled through bearing openings in plate 20 that are secured between the cross brace 4 and the supports for the outer bearings 12' for the shafts 12.

As far as the description has progressed it will be seen that there are two rotary brushes 21, adjacent each of the inner sides of the frame or body 1, and that these brushes are rotated by the turning of the wheels 6.

There may be flexible connections between the hubs for the brushes or the shafts 19 may form the hubs for the said brushes. The plates 20 form the outer elements of substantially rectangular members which surround the respective pairs of brushes on the inner sides of the device, the shafts 19 or the lower portions of the hubs finding bearings in the lower plates 22 of the said substantially rectangular members. The rectangular members support thereon pans 23. The supporting means for the pans are in the nature of elongated bolts 24 that pass through the members 22 and through the sides of the pans, there being nuts 25 screwed on the opposite ends of the bolts and contacting with the sides of the pans. By adjusting these nuts it will be apparent that the brushes may be arranged at vertical angles in the pans. The outer and rear walls or flanges of the pans are closed by a guard member 26, and the top of the frame, at the portion thereof provided with the brushes and the actuating means therefor are normally concealed by a flanged shield 27.

The outer corners of the pans are rounded, as at 28, that is the corners nearest the front of the frame, and these rounded corners provide a widened mouth for the passage 29 between the pans and through which passage the growth of cotton is received when the machine is moved thereover.

On the inner faces of the beam 2, adjacent to the outer end thereof, there are brackets 30 through which are journaled short shafts 31, the said shafts also passing through bearings 32 on the side members of the frame 1. On each of the brackets there is fixed a toothed segment 33 and on each of the shafts 31 there is fixed a handle 34 that is provided with a hand operated dog 35 to engage with the teeth of the segments 33. Each lever has fixed thereon a rod 36, and each rod is connected to an angle arm 37 that is formed on a member 38 that is fixedly secured on a shaft 39 that is journaled through bearings 40 and 41 that are secured respectively to the side members of the frame and to the upper members 20 of the substantially rectangular brush and pan supports. Each of the members 38 is formed with a second finger 42 disposed at an opposite angle to the finger 37, and pivotally attached to the last mentioned fingers and likewise pivotally attached to the depending or crank portions there are rods 43. Obviously by swinging the levers 34 the crank portions of the axles will be likewise swung to bring the body of the device toward or away from the ground and thereby compensate for the operation of the improvement upon various heights of growths of cotton.

Fixed between the side members of the frame to the rear of the cross beam 2 there is another cross beam 44. On this cross beam, and adjacent to the sides of the frame 1 there are fixed segmental racks 45. Journaled through each of the racks 45 and the bearings 46 on the side members of the frame there are short shafts 47. Fixed on each of these shafts is a lever 48. Each lever carries a hand operated dog 49 to engage with the teeth of the respective segmental racks 45. Loosely fixed to each of the levers there is a rod 50 and in the showing of Figure 1 of the drawings, these rods 50 are pivotally connected to bifurcated brackets 51 on the frames or heads 52 for cultivator teeth 53; the said frames or heads being pivotally connected, as at 54, to the cross beam 44. Obviously by operating either of the levers 48 the cultivator shovels 53 may be brought into proper ground contacting engagement. On the rear of the frame 1 there is fixed the driver's seat 55.

In lieu of the shovels disclosed by Figs. 1, 2 and 3 of the drawings there may be pivotally attached to the beam 44 the supporting frame 54' for spaced scraper rake teeth 55. In this instance only one lever, similar to the lever 48 is employed for swinging the frame 54' toward or away from the main frame 1. Also in lieu of the cultivator shovels 53 there may be attached either to the frame 54' or to the frames or supports 52 for the said shovels 53 a cross piece 56 to which there is secured spaced teeth 57 as disclosed by Fig. 6 of the drawings the rake construction being shown by Fig. 5 of the drawings.

After the cotton has been planted the rakes or the toothed bar 56 may be employed for agitating the outer earth strata around the planted seeds. When the seeds have germinated and the young cotton plants appear the toothed bar 56 may be again employed for cultivating around the young growths. As the cotton progresses in its growth the cultivator shovels are employed, in which instance the cranked axle for the wheels is regulated to raise the pans above the coton growth. As the growth of the cotton progresses the shovels 53 are still employed and the levers 48 are actuated to bring the pans and the brushes therein between the rows of cotton growths so that the rotation of the brushes will remove boll weevils and other insects therefrom and likewise clean the cotton in the growing thereof. The levers are adjusted so that the brushes are properly arranged with respect to the cotton until the same has reached its full growth and from experience I have found that by continuous cultivation and by brushing the cotton to remove the insects and the larva of insects therefrom a healthy and marketable crop is produced with the minimum amount of labor upon the part of the operator of the machine.

Having described the invention, I claim:

In a machine for the purpose set forth, a frame, a crank shaft journaled on the frame, and wheels journaled on the crank shaft, vertically disposed fibrous brushes arranged in opposite pairs on the frame, bearings for the brushes, spring influenced means associated with the lower bearings for permitting a vertical canting of the brushes on their upper bearings, adjustable means for said spring means, pans beneath the brushes, guards for the pans, a shield on the frame arranged over the brushes, means actuated by the turning of the wheels for imparting a simultaneous rotary motion to the pairs of brushes in opposite directions, and means for adjusting the brushes vertically with respect to the frame.

In testimony whereof I affix my signature.

MARTIN SANCHEZ.